(12) United States Patent
Konop et al.

(10) Patent No.: US 6,206,443 B1
(45) Date of Patent: Mar. 27, 2001

(54) MOTOR VEHICLE STORAGE AREA LINER

(76) Inventors: Robert Konop, 342 S. 40th St., Unit 30, Mesa, AZ (US) 85206; Michael Petek, 5005 284th St. NW., Stanwood, WA (US) 98292

( * ) Notice: Subject to any disclaimer, the term of this patent is extended or adjusted under 35 U.S.C. 154(b) by 0 days.

(21) Appl. No.: 09/281,732

(22) Filed: Mar. 30, 1999

Related U.S. Application Data
(60) Provisional application No. 60/079,841, filed on Mar. 30, 1998.

(51) Int. Cl.[7] .................................................. B60R 13/01
(52) U.S. Cl. ..................... 296/39.1; 229/164; 229/229; 229/186; 229/188
(58) Field of Search ................................ 296/39.1, 39.2, 296/37.16; 224/542; 229/164, 229, 186, 188; 105/423

(56) References Cited

U.S. PATENT DOCUMENTS

| | | | |
|---|---|---|---|
| 4,890,874 | * | 1/1990 | Davis .................................. 296/39.2 |
| 5,110,171 | * | 5/1992 | Anthony .............................. 296/39.2 |
| 5,570,921 | * | 11/1996 | Brooker ............................. 296/39.1 |
| 5,722,710 | * | 3/1998 | Falciani ............................. 296/39.1 |

* cited by examiner

Primary Examiner—D. Glenn Dayoan
Assistant Examiner—Jason Morrow
(74) Attorney, Agent, or Firm—Dean A. Craine

(57) ABSTRACT

An inexpensive, discardable liner for the storage area of a motor vehicle including a main panel made of durable material. The main panel includes multiple fold lines which enable it to be folded into an enclosure capable of holding various objects. More particularly, the main panel is divided into an integrally attached bottom panel, a back panel, two side panels, and a front panel. The back and front panels each include folding tabs with engage slots formed on the side panels to hold the back, front and side panels in a perpendicularly aligned position. Hook and loop connector strips may be used in place of the tabs and slots. Optional fold lines are also included on the side panels which enable the front panel to be selectively positioned in alignment with the rear seat.

7 Claims, 2 Drawing Sheets

MOTOR VEHICLE STORAGE AREA LINER

This is a utility patent application based on a provisional patent application (Ser. No. 60/079,841) filed Mar. 30, 1998.

BACKGROUND OF THE INVENTION

1. Field of the Invention

This invention relates to a protective liner for protecting the cargo area and sides of a motor vehicle when carrying cargo, and more particularly, to such a liner made of disposable material that is selectively adjustable in size to fit the cargo area of different types of motor vehicles.

2. Description of the Related Art

Minivans and sports utility vehicles are very popular. One reason for their popularity is that they can transport a large number of people and cargo. Although these vehicles provide a truck-like ride, their interiors often include leather upholstery and deep-piled carpeting which most owners want to protect.

Disposable liners have been used to protect the bed of a pick-up truck. For example, U.S. Pat. No. 4,890,874 describes a disposable liner for the bed of a pick-up truck having a pair of side flaps, a front flap, a tailgate flap, and a pair of wheel well knockouts.

One drawback with these liners is that they are not designed to be used in the interior storage area of a station wagon, minivan or a sports utility vehicle. An important functional difference between the storage areas in these types of vehicles and the bed of a pick-up truck is that the liner for a station wagon, minivan or a sports utility vehicle can be made of non-water resistant material and must have sealed bottom and side panels to prevent spillage or leakage into the storage area. Another important functional difference is that the front flap of the liner should be adjustable to conform with the back support of the rear seat so that the entire storage area may be used. A further important functional difference is that the rear flap of the liner should be adjustable to partially or completely open to allow cargo items to be easily placed or removed from the liner and at the same time, keep any loose cargo items from spilling onto the carpet.

SUMMARY OF THE INVENTION

It is an object of the invention to provide a disposable, protective liner for a station wagon, minivan or sports utility vehicle.

It is a further object of the invention to provide such a liner that allows cargo to be easily placed or removed from the liner and prevents loose cargo materials from spilling or leaking onto the storage area.

It is another object of the invention to provide such a liner that has an adjustable front panel that conforms with the angle of back support on the rear seat so that all of the storage area may be utilized.

These and other objects are met by providing an inexpensive, discardable liner for the cargo area of the interior storage area of a motor vehicle. The liner is made of paper material designed to be folded into a compact manner when not in use. The liner includes a main panel with a plurality of fold lines which divide the main panel into an integrally attached bottom panel, a back panel, two side panels and a front panel. The liner includes attachment means which hold the back, front and side panels in an upright, perpendicularly aligned position relative to the bottom panel thereby forming a partially closed enclosure. Formed between the ends of the front panel and each side panel are a plurality of fold lines which enable the front panel to be selectively aligned at different angles relative to the bottom and side panels so that it may conform with the angle of the back support on the rear seat. The front panel can also be completely folded downward and extended forward so that it is longitudinally aligned with the bottom panel when the rear seat is removed or moved forward in the motor vehicle. The rear flap includes a mid-line fold line which enables its upper section to be folded downward so that cargo may be easily loaded or unloaded from the liner. The rear flap may also be completely folded downward and longitudinally aligned with the bottom panel so that the entire cargo area is protected and utilized.

DESCRIPTION OF THE PREFERRED EMBODIMENT(S)

Figure 1:
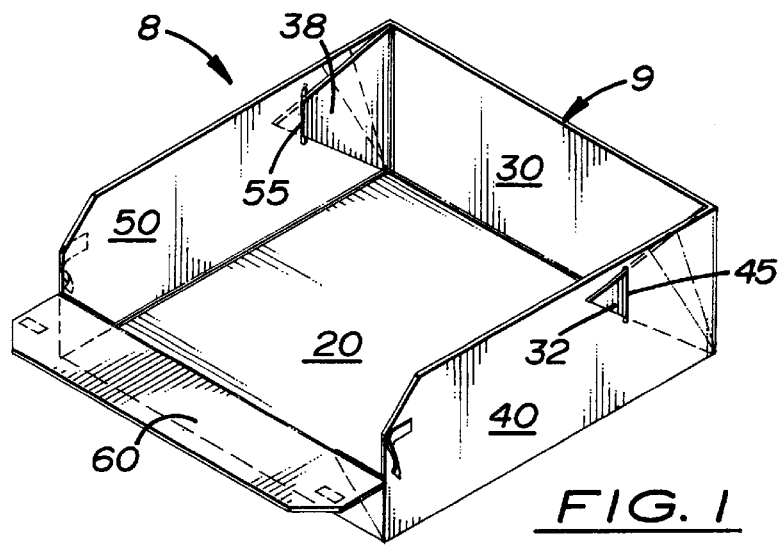
FIG. 1 is a perspective view of the invention disclosed herein.

Shown in the accompanying FIGS. 1–5, there is shown an inexpensive, discardable liner, generally referred to as 8, for the storage area of a motor vehicle including a main panel 10 made of lightweight, inexpensive, discardable material, such as cardboard. The main panel 10 includes multiple fold lines 11–14 which enable the main panel 10 to be folded into a partially closed enclosure 9 capable of holding various objects. During use, the fold lines 11–14 divide the main panel 10 to form an integrally attached bottom panel 20, front panel 30, two side panels 40, 50, and a back panel 60.

Figure 2:
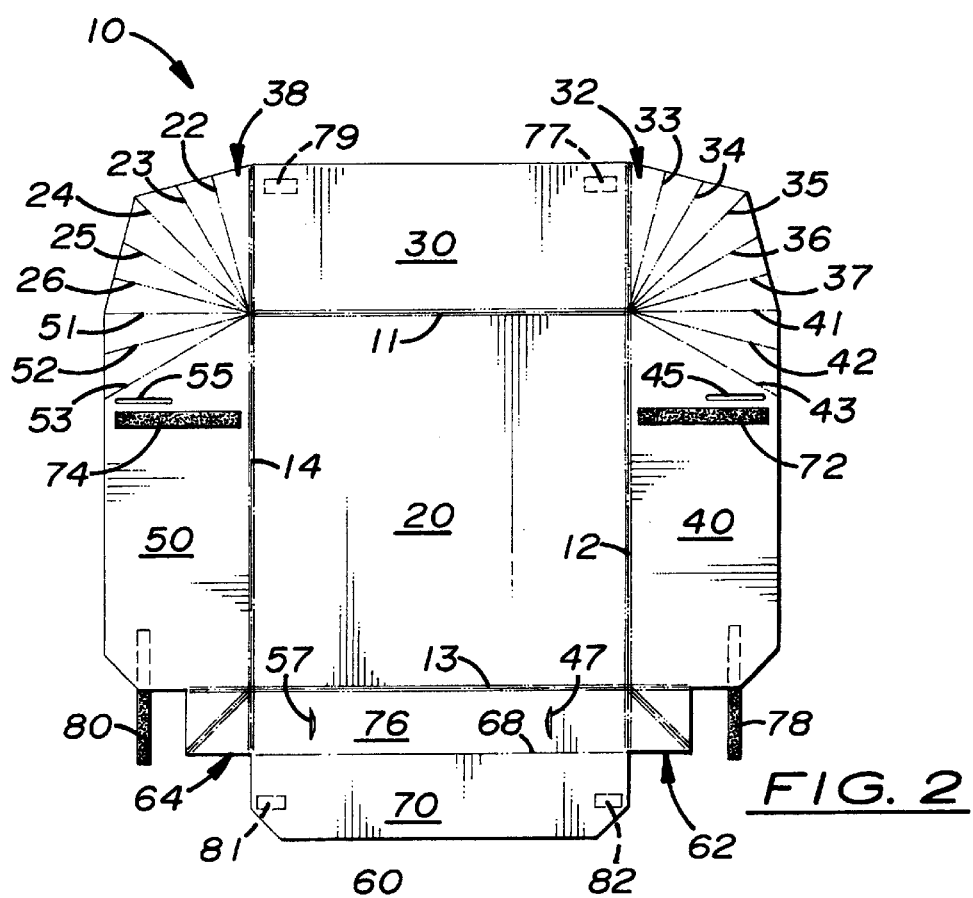
FIG. 2 is a top plan view of the invention.

In the preferred embodiment shown in the FIGS. 1 and 2, the front panel 30 includes on its opposite ends two folding expansion tabs 32, 38, which, when folded perpendicularly, engage slots 45, 55, respectively to the front panel 30, formed on the side panels 40, 50. During use the tabs 32, 38 engage the slots 45, 55, respectively, and hold the opposite ends of the front panel 30 and the side panels 40, 50, in a perpendicularly aligned position. The side panels 40, 50 each include folding expansion tabs 62 and 64 which engage slots 47, 57 formed on the back panel 60 to hold the rear end of the two side panels 40, 50 and the back panel 60 in a perpendicularly aligned position relative to each other.

Figure 3:
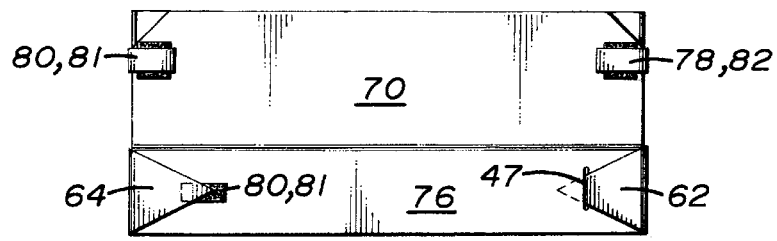
FIG. 3 is a rear elevational view of the invention.

Hook connector strips 72, 74 and hook connector pads 77, 79, respectively, may replace slots 45, 55 to hold the panels 30, 40, 50 together. As shown in FIG. 3, hook connector strips 78 and 80, and hook connector pads 81 and 82 may be used to hold the upper section 70 of the rear panel 60 and replace slots 47 and 57 to hold the lower section 76 to the side panels.

Figure 4:
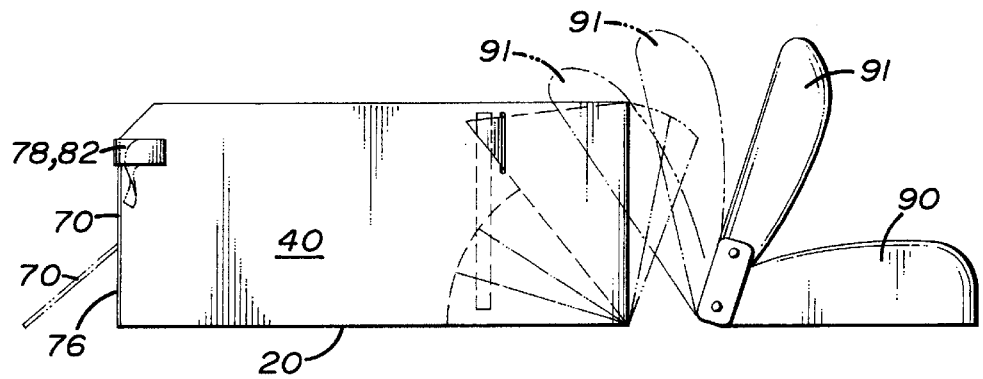
FIG. 4 is a side elevational view of the invention disposed in the storage area of a vehicle with the front panel being adjusted relative to the bottom panel so that it conforms with the angle of the back support on a rear seat.
Figure 5:
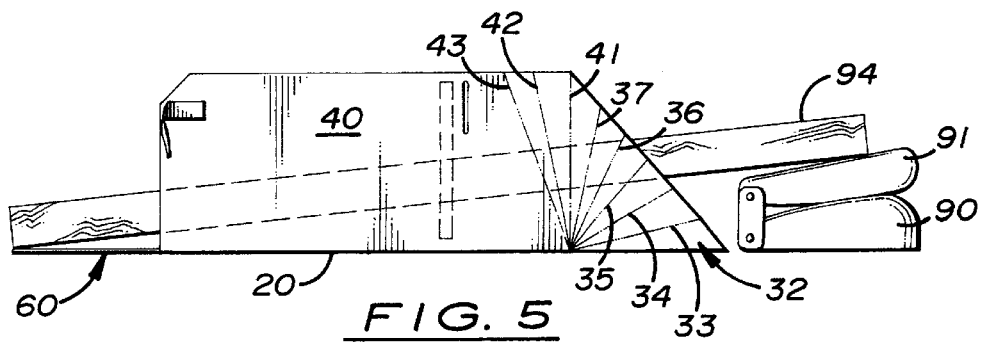
FIG. 5 is a side elevational view of the invention showing the front and rear panels each folded downward, extended outward and downward parallel to the bottom panel.

A plurality of fold lines 33–37 and 22–26 are formed on expansion tabs 32, 38, and a plurality of fold lines 41–43 and 51–53 are formed on the front section of side panels 40, 50, respectively. These fold lines enable the expansion tabs 32, 38 and the front sections of the side panels 40, 50 to fold inward so that the front panel 30 may be adjusted in a position relative to the rear seat 90 as shown in FIGS. 4 and 5.

In the preferred embodiment, the main panel 10 is made of cardboard, approximately one-eighth to three-sixteenths of an inch thick, approximately seventy-four inches in length, and approximately seventy-seven inches in width. The panels 30, 60 each measure approximately thirty-eight inches in length and nine inches in width. The panels 40 and 50 each measure approximately forty-one inches in length and eighteen inches in width. The rear panel 60 is divided along its mid-line axis by a fold-line 68 which divides it into upper and lower sections 70, 76, respectively. The upper section 70 is approximately eighteen inches in width and the lower section 76 is approximately nine inches in width.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

What is claimed is:

1. A motor vehicle storage area liner, comprising:
   a. a main panel made of durable, lightweight material, said main panel divided into a back panel, a bottom panel, a front panel, a right side panel, and a left side panel to form a partially closed enclosure;
   b. a front panel attachment means for selectively attaching said front panel in an upright position relative to said bottom panel and between said right side panel and said left side panel when said right side panel and said left side panel are both aligned upright and perpendicular to said bottom panel;
   c. a rear panel attachment means for selectively attaching said rear panel in an upright perpendicularly aligned position relative to said bottom panel and between said right side panel and said left side panel when said right side panel and said left side panel are aligned upright and perpendicular to said bottom panel; and
   d. a front panel adjustment means for adjusting the angular position of the said front panel relative to said bottom panel.

2. A motor vehicle storage area liner, as recited in claim 1, wherein said front panel attachment means are two expansion tabs formed on opposite ends of said front panel and slots formed on said right side panel and said left side panel capable of receiving one said expansion tab to attach said front panel to said right side panel and said left side panel.

3. A motor vehicle storage area liner, as recited in claim 2, further including a plurality of fold lines formed on said expansion tabs and on said right side panel and said left side panel which enable the angular orientation of said front panel relative to said bottom panel to be adjusted.

4. A motor vehicle storage area liner, as recited in claim 3, wherein said rear panel further includes a front flap capable of being disposed in an extended outward position substantially parallel to said bottom panel.

5. A motor vehicle storage area liner, as recited in claim 4, further including hook and loop connectors located between said front flap and said right side panel and said left side panel to selectively hold said front flap in an upright position.

6. A motor vehicle storage area liner, as recited in claim 1, wherein said back panel, said front panel, said rear panel, said right side panel and said left side panel are all integrally attached to said bottom panel.

7. A motor vehicle storage area liner, as recited in claim 6, wherein said main panel is made of paper material.

* * * * *